(12) United States Patent
Panuganti (10) Patent No.: US 11,861,608 B2
(45) Date of Patent: Jan. 2, 2024

(54) METHODS AND SYSTEMS FOR MAKING ON-DEMAND PAYMENTS VIA AN ELECTRONIC COMMUNICATION

(71) Applicant: Visa International Service Association, San Francisco, CA (US)

(72) Inventor: Kalyana Krishna Panuganti, Bothell, WA (US)

(73) Assignee: Visa International Service Association, San Francisco, CA (US)

( * ) Notice: Subject to any disclaimer, the term of this patent is extended or adjusted under 35 U.S.C. 154(b) by 135 days.

(21) Appl. No.: 16/821,771

(22) Filed: Mar. 17, 2020

(65) Prior Publication Data

US 2021/0295318 A1 Sep. 23, 2021

(51) Int. Cl.
| | |
|---|---|
| G06Q 20/00 | (2012.01) |
| G06Q 20/38 | (2012.01) |
| G06Q 20/10 | (2012.01) |
| G06Q 20/40 | (2012.01) |

(52) U.S. Cl.
CPC ......... *G06Q 20/388* (2013.01); *G06Q 20/102* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 8,595,134 B2 | 11/2013 | Kelly | |
| 8,762,272 B1 | 6/2014 | Cozens | |
| 10,515,368 B1 * | 12/2019 | Hecht | |
| 2003/0097561 A1 * | 5/2003 | Wheeler | G06Q 20/3823 |
| | | | 713/168 |
| 2003/0101136 A1 * | 5/2003 | Wheeler | G06Q 20/3825 |
| | | | 705/42 |
| 2003/0115151 A1 * | 6/2003 | Wheeler | G06Q 20/00 |
| | | | 705/64 |
| 2006/0085450 A1 * | 4/2006 | Seubert | G06Q 30/04 |
| 2012/0030098 A1 * | 2/2012 | Bulawa | G06Q 20/401 |
| | | | 705/40 |
| 2013/0151400 A1 * | 6/2013 | Makhotin | |

(Continued)

OTHER PUBLICATIONS

Lost Opportunity Why Has Dominant Design Failed to Emerge for the Mobile Payment Services Market in Finland? (Year: 2008).*

(Continued)

*Primary Examiner* — Bruce I Ebersman
(74) *Attorney, Agent, or Firm* — Schwabe, Williamson & Wyatt, PC (57) ABSTRACT

Methods and systems are described. A method includes accessing a first identifier of a payment requester and a first identifier of an electronic communication from an electronic communication client that identifies a payment requester and an electronic communication, authenticating the payment requester as being registered to receive payments, if the payment requester is authenticated, automatically identifying a payment service that is registered as an approved payer, and authenticating the payment service as being approved to make payments to the payment requester. In response to a selection of a funds transfer triggering component in the electronic communication, causing a transfer of funds from the approved payment service to the payment requester.

9 Claims, 5 Drawing Sheets

(56) References Cited

U.S. PATENT DOCUMENTS

| | | | | |
|---|---|---|---|---|
| 2013/0253965 A1* | 9/2013 | Joseph | ............... | G06Q 20/4016 |
| | | | | 705/5 |
| 2013/0346302 A1* | 12/2013 | Purves | ................. | G06Q 20/102 |
| | | | | 705/40 |
| 2014/0032398 A1* | 1/2014 | Killoran | ............. | G06Q 20/3276 |
| | | | | 705/39 |
| 2014/0032438 A1* | 1/2014 | Killoran | ............... | G06Q 20/102 |
| | | | | 705/329 |
| 2014/0337216 A1* | 11/2014 | Anand | ............... | G06Q 20/4016 |
| | | | | 705/44 |
| 2017/0232291 A1* | 11/2017 | Donga | | |
| 2017/0323291 A1* | 11/2017 | Donga | ............... | G06Q 20/3552 |
| 2018/0293573 A1* | 10/2018 | Ortiz | .................... | G06Q 20/102 |
| 2021/0158317 A1* | 5/2021 | Kurylko | | |

OTHER PUBLICATIONS

Wallet-on-Wheels—Using Vehicle's Identity for Secure Mobile Money (Year: 2013).*

Recommendations for the security of mobile payments (Year: 2013).*

Use Cases of Authentication Protocols in the Context of Digital Payment System 2020 (Year: 2020).*

Pay Bills and Invoices in Outlook Using Microsoft Pay; retrieved from the Internet at <https://support.office.com/en-us/article/pay-bills-and-invoices-in-outlook-using-microsoft-pay-1196e7e6-c096-44f1-a18a-9df3af832a48>; initially retrieved from the Internet on Dec. 6, 2019; 5 pages.

* cited by examiner

METHODS AND SYSTEMS FOR MAKING ON-DEMAND PAYMENTS VIA AN ELECTRONIC COMMUNICATION

TECHNICAL FIELD

Embodiments of the disclosure pertain to systems and methods for making payments and, in particular, systems and methods for making on-demand payments via an electronic communication.

TECHNOLOGY BACKGROUND

A common practice of vendors is to send emails to their customers to remind them that a payment is due. Vendors that send such emails include but are not limited to cable, telecom, wireless and utility vendors (e.g., Comcast®, AT&T®, T-Mobile®, local utility departments, etc.). It should be appreciated that each vendor can have their own manner of accepting payment. For example, customers can be required to sign up on the vendor's own bill payment system or use third party providers to make payments. Thus, conventional processes can require significant amounts of time and effort.

DESCRIPTION OF THE EMBODIMENTS

The embodiments described herein are not intended to be limited to the specific forms set forth herein. The embodiments are intended to cover such alternatives, modifications, and equivalents that are within the scope of the appended claims.

The detailed description that follows includes numerous specific details such as specific method orders, configurations, structures, elements, and connections have been set forth. It is to be understood however that these and other specific details need not be utilized to practice embodiments. In other embodiments, well-known structures, elements, or connections have been omitted, or have not been described in a manner so as not to obscure this description.

Any reference within the specification to "one embodiment" or "an embodiment" is intended to indicate that a particular feature, configuration, structure, or characteristic described in connection with the embodiment is included in at least one embodiment of the present invention. The appearance of the phrase "in one embodiment" in different parts of the specification can refer to different embodiments. Embodiments described as separate or alternative embodiments are not mutually exclusive of other embodiments. Moreover, various features are described which may be included in some embodiments and not by others. In addition, some requirements for some embodiments may not be required for other embodiments.

In the following description, unless indicated otherwise terms such as "accessing" or "authenticating" or "causing" or the like, refer to the operations and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

System Architecture

Figure 1A:
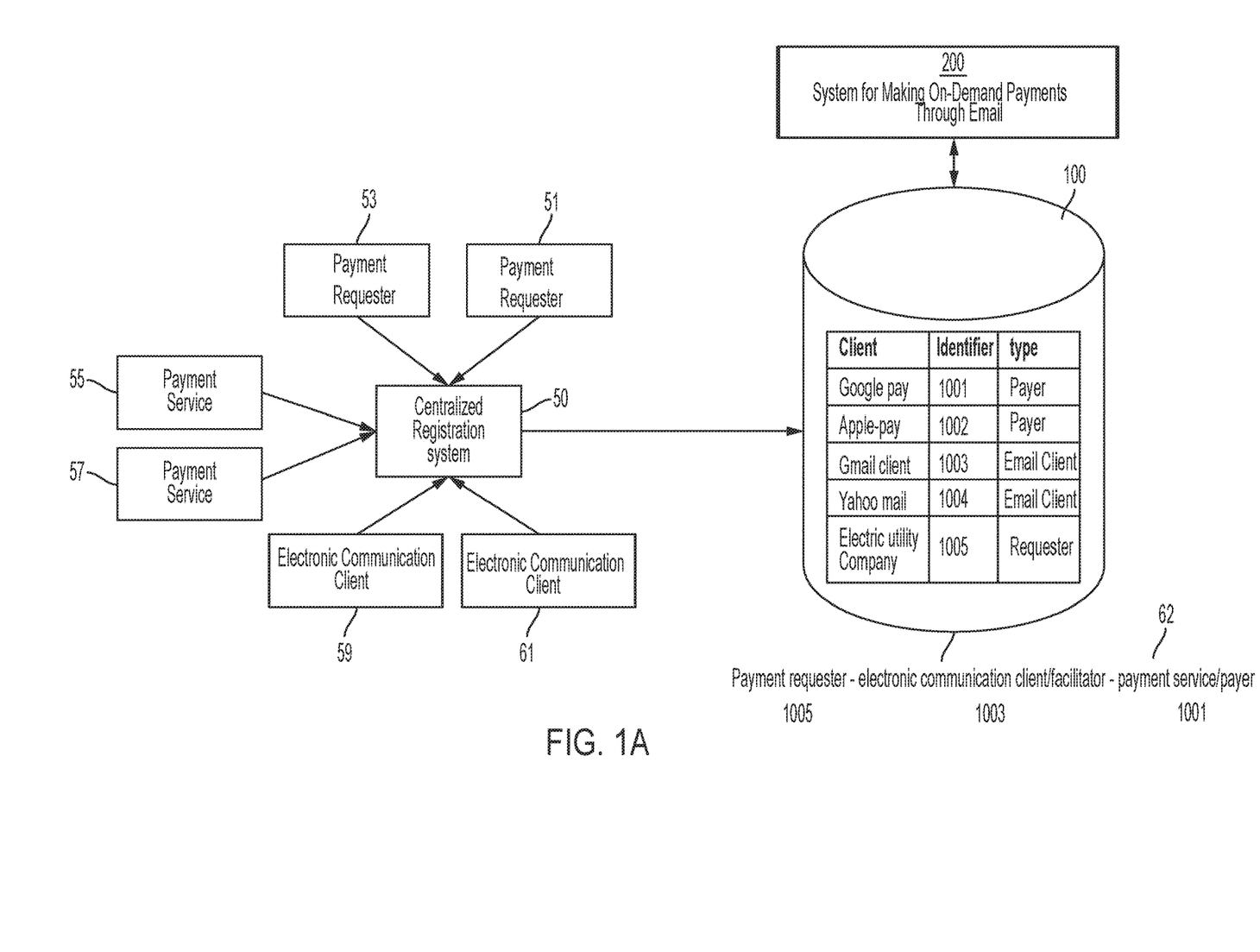
FIG. 1A shows a centralized payment registration system according to an embodiment.

FIG. 1A shows a centralized payment registration system 50 and system 200 for making on-demand payments via an electronic communication according to an embodiment. In an embodiment, the system 200 for making on-demand payments via an electronic communication facilitates on-demand payments using a centralized payment registration system (described in detail below) which registers payment services, electronic communication clients and payment requesters. In an embodiment, as used herein electronic communication is intended to refer to electronic communications, or electronic messages that can include but are not limited to email, texts, and other digital communications and messages. In an embodiment, bill payers are able to make payments to payment requesters directly from an electronic communication that they have received. FIG. 1A shows system 200, database 100, payment requester 51, payment requester 53, payment service 55, payment service 57, electronic communication client 59, and electronic communication client 61.

Figure 1B:
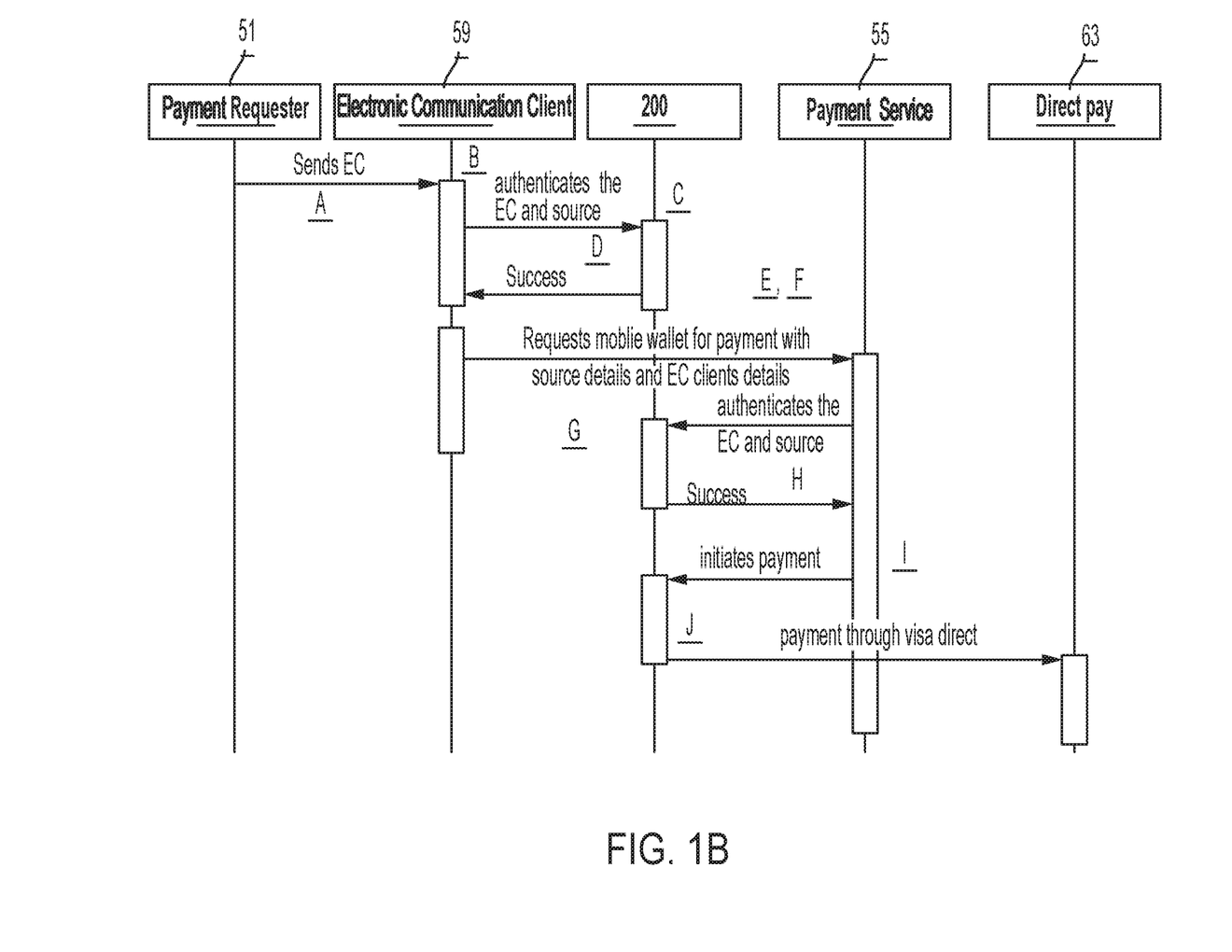
FIG. 1B shows operation performed by a system for making on-demand payments via an electronic communication according to an embodiment.

Referring to FIG. 1B, payment services, payment facilitators and payment requesters can register with the payment registration system 50 for purposes of enabling on demand payments from payment services such as payment service 55 and payment service 57 to payment requesters such as payment requester 51 and payment requester 53. In an embodiment, payment service 55 and payment service 57 can include but are not limited to payment services such as Google Pay® and Apple Pay®. In an embodiment, payment requester 51 and payment requester 53 can include but are not limited to vendors such as an Comcast®, AT&T®, T-Mobile® or local utility departments. In an embodiment, electronic communication client 59 and electronic communication client 61 can include but are not limited to non-mobile electronic communication clients or mobile electronic communication clients such as Gmail® and Yahoo® mail. In an embodiment, identifiers of the payment requesters, electronic communication clients/facilitators and payment services/payers can be associated in the database. For example, referring to FIG. 1A, an example association 62 of identifiers is shown below database 100.

In an embodiment, as regards mobile phone users a bill payment methodology is provided that can be used across payment requesters. In particular, the problem of users having to respond to payment requests by using a variety of methods is obviated. In an embodiment, system 200 for making on-demand payments via an electronic communication can be used with any electronic communication client such as Gmail®, Outlook®, etc. In an embodiment, electronic communication clients and their wallet systems can be registered with the centralized payment registration system 50 to provide payments through electronic communications. For example, subsequent to being registered, when an electronic communication is delivered to a user's electronic communication system, the user can directly respond to that electronic communication by making payment using a mobile wallet.

Operation

FIG. 1B illustrates operations A-J performed by the system 200 for making on-demand payments via an electronic communication according to an embodiment. In particular, FIG. 1B illustrates interactions between payment requester 51, electronic communication client 59, system 200, payment service 55, and direct pay service 63 are illustrated.

Referring to FIG. 1B, at A, payment requester 51 sends an electronic communication (EC in FIG. 1B) to an electronic communication client 59 that includes a request for payment.

At B, the electronic communication, including the request for payment, is accessed by system 200 via the electronic communication client 59.

At C, payment requester and electronic communication identifiers that are accessed from the electronic communication client 59 are reviewed for authentication by system 200. In an embodiment, the payment requester and electronic communication identifiers are reviewed to determine if the payment requester 51 is registered as approved to receive payments in response to the request for payment sent in the electronic communication. For example, in an embodiment, the identifiers received from the electronic communication client 59 are reviewed to determine if the electronic communication and the payment requester coincides, in particular, to determine whether their identifiers are associated in the database of the centralized registration system (see FIG. 1A).

At D, the payment requester 51 is determined to be registered and approved to receive a payment in response to the request for payment. In an embodiment, the successful authentication is then communicated to the electronic communication client 59.

At E, if the payment requester 51 is approved, the payment service 55 that is registered as an approved payment service for the payment requester 51 (in database 100 in FIG. 1A) is automatically identified by system 200.

At F, the electronic communication client 59 requests payment from the payment service 55. In an embodiment, the payment service 55 can include a mobile wallet. In other embodiments, the payment service 55 can include other electronic payment services. In an embodiment, the electronic communication client 59 can request payment based on the selection of an object in the electronic communication that initiates the execution of operations that effect payment. In an embodiment, the request for payment includes payment requester details and electronic communication client details.

At G, a request is made for system 200 to authenticate the electronic communication and the payment requester 51. In an embodiment, system 200 authenticates the electronic communication and the payment requester 51 by determining if the electronic communication and payment requester associated with the request for authentication coincide (e.g., by accessing a repository of the relevant information such as database 100 in FIG. 1A).

At H, system 200 provides an indication to the payment service 55 that the electronic communication and the payment requester 51 have been successfully authenticated.

At I, payment is initiated from the payment service 55. In an embodiment, the payment service 55 can include but is not limited to wallet-based and non-wallet based electronic payment services.

At J, system 200 causes a transfer of funds from the approved payment service 55 to the payment requester 51 via a direct pay service 63. In an embodiment, as indicated above, the transfer of funds can be based on the selection of a funds transfer triggering component in the electronic communication sent from the payment requester 51.

Figure 2:
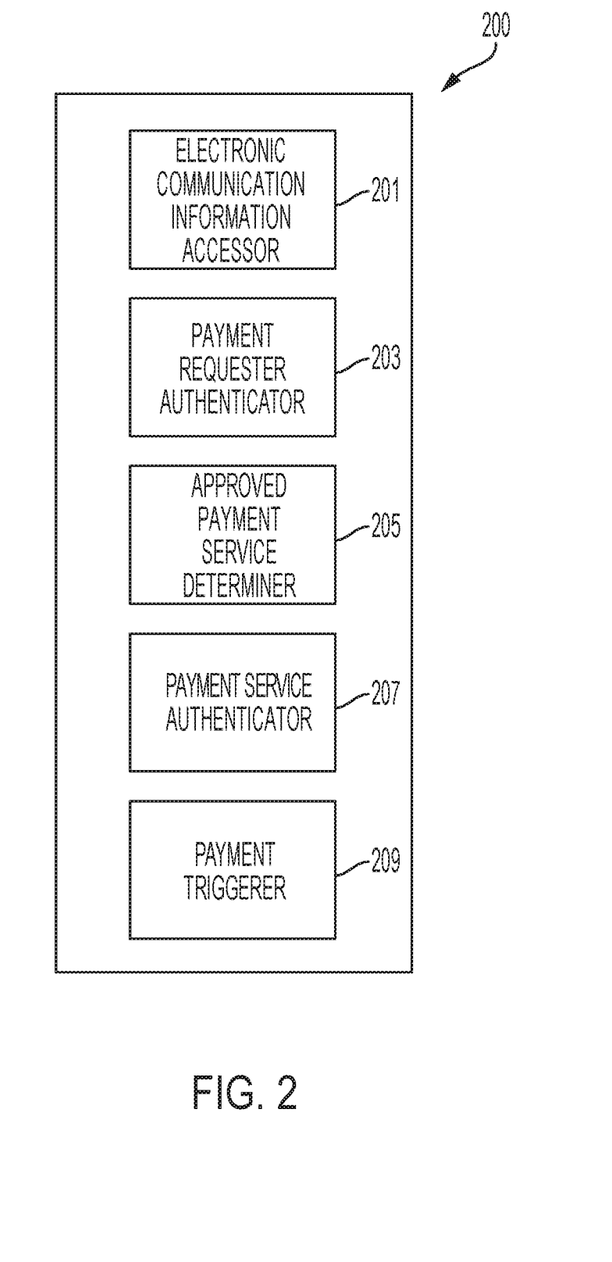
FIG. 2 shows the components of a system for making on-demand payments via an electronic communication according to an embodiment.

Components of System for Making on-Demand Payments Via an Electronic Communication FIG. 2 shows components of a system 200 for making on-demand payments through electronic communication according to an embodiment. FIG. 2 shows electronic communication information accessor 201, payment requester authenticator 203, approved payment service determiner 205, payment service authenticator 207 and payment triggerer 209.

Electronic communication information accessor 201 accesses information from an electronic communication that includes a request for payment from a payment requester. In an embodiment, the information includes payment requester and electronic communication identifiers.

Payment requester authenticator 203 authenticates the payment requester as being registered to receive payments in response to the request for payment. In an embodiment, in order to authenticate the payment requester, the payment requester and electronic communication identifiers that are accessed from the electronic communication client are compared to payment requester and electronic communication client data in a storage system or database (e.g., database 100 in FIG. 1A) for authentication. For example, in an embodiment, the payment requester identifier can be reviewed to determine if the payment requester is registered as approved to receive payments in response to the request for payment, and the electronic communication identifier can be reviewed to determine if the electronic communication is registered as coinciding with the payment requester.

Approved payment service determiner 205 automatically identifies a payment service that is registered as an approved payer. In an embodiment, the approved payment service can be automatically identified upon authentication of the payment requester. In an embodiment, when the payment service is identified, a request for payment can be sent from the electronic communication client to the identified payment service.

Payment service authenticator 207 authenticates the payment service by determining if the payment service is approved to make payments to the payment requester. In an embodiment, in order to authenticate the payment service, payment requester and electronic communication identifiers are accessed from the payment service and compared to data in the storage system or database for authentication. In an embodiment, the payment requester and electronic communication identifiers are reviewed to determine if the payment service is registered as approved to make payments to the payment requester in response to the request for payment in the electronic communication.

Payment triggerer 209 causes a transfer of funds from the approved payment service to the approved payment requester in response to a selection of a funds transfer triggering component in the electronic communication. In an embodiment, the funds can be transferred from a payment service to the payment requester via a direct payment service. In an embodiment, the direct payment service can include but is not limited to a payment service such as Visa Direct®. In other embodiments, the funds can be transferred from a payment service to the payment requester in other manners.

FIG. 2 illustrates an example manner of implementing the system 200 of FIG. 1A. In an embodiment, one or more of the elements, processes, components and/or devices of the system 200 (e.g., electronic communication information accessor 201, payment requester authenticator 203, approved payment service determiner 205, payment service authenticator 207 and payment triggerer 209) may be integrated, separated, re-arranged, omitted, eliminated and/or implemented in other manners. In an embodiment, the components of system 200 (e.g., electronic communication information accessor 201, payment requester authenticator 203, approved payment service determiner 205, payment service authenticator 207 and payment triggerer 209) can be implemented using hardware, software, firmware and/or any combination thereof. In particular, components of system 200 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 200, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 200 can include one or more elements, processes and/or devices in addition to, or instead of, those illustrated in FIG. 2, and/or may include more than one of any or all of the illustrated elements, processes and devices.

Figure 3:
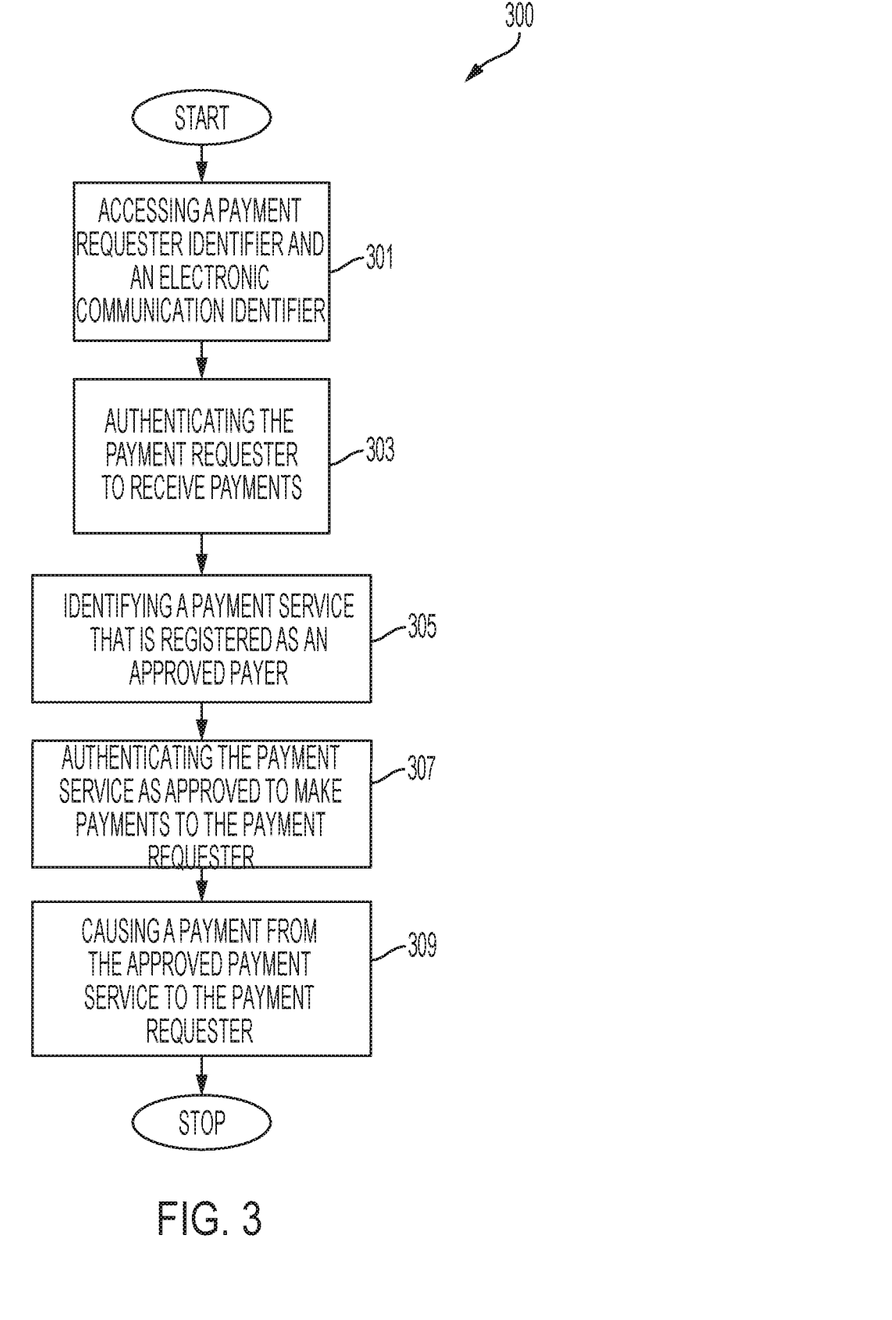
FIG. 3 shows a flowchart of a method for making on-demand payments via an electronic communication according to an embodiment.

FIG. 3 is a flowchart 300 of a method for making on-demand payments through electronic communication as performed by system 200 according to an embodiment. Referring to FIG. 3, the method includes at 301, accessing a first identifier of a payment requester and a first identifier of an electronic communication from an electronic communication client that identifies a payment requester and an electronic communication. At 303, authenticating the payment requester as being registered to receive payments. At 305, if the payment requester is authenticated, automatically identifying a payment service that is registered as an approved payer. At 307, authenticating the payment service as being approved to make payments to the payment requester. At 309, in response to a selection of a funds transfer triggering component in the electronic communication, causing a transfer of funds from the approved payment service to the payment requester.

In an embodiment, the method further includes prior to accessing the first identifier of the payment requester and the first identifier of the electronic communication, registering and associating one or more payment requesters, electronic communications, and payment services in a database. In an embodiment, authenticating the payment requester includes accessing a database to determine if the payment requester and the electronic communication associated with the first identifier of the payment requester and the first identifier of the electronic communication coincide. In an embodiment, identifying the payment service that is registered as an approved payer includes accessing a database to determine if the payment service is registered in the database as an approved payer. In an embodiment, authenticating the payment service includes accessing a second identifier of the payment requester and a second identifier of the electronic communication from the payment service. In an embodiment, causing a transfer of funds from the approved payment service to the payment requester includes a transferring of funds directly into a payment requester account through a money transfer system. In an embodiment, the money transfer system can include but is not limited to Visa Direct®. In an embodiment, the electronic communication client and the payment service may be owned by the same company or may not be owned by the same company.

In an embodiment, the operations of the flowchart 300 can correspond to machine readable instructions of a program that can be executed by a processor of a computer system 400 such as is discussed with regard to FIG. 4 below. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowchart of FIG. 3 may be changed. In addition, one or more of the blocks of the flowchart can be eliminated or added.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device. Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Figure 4:
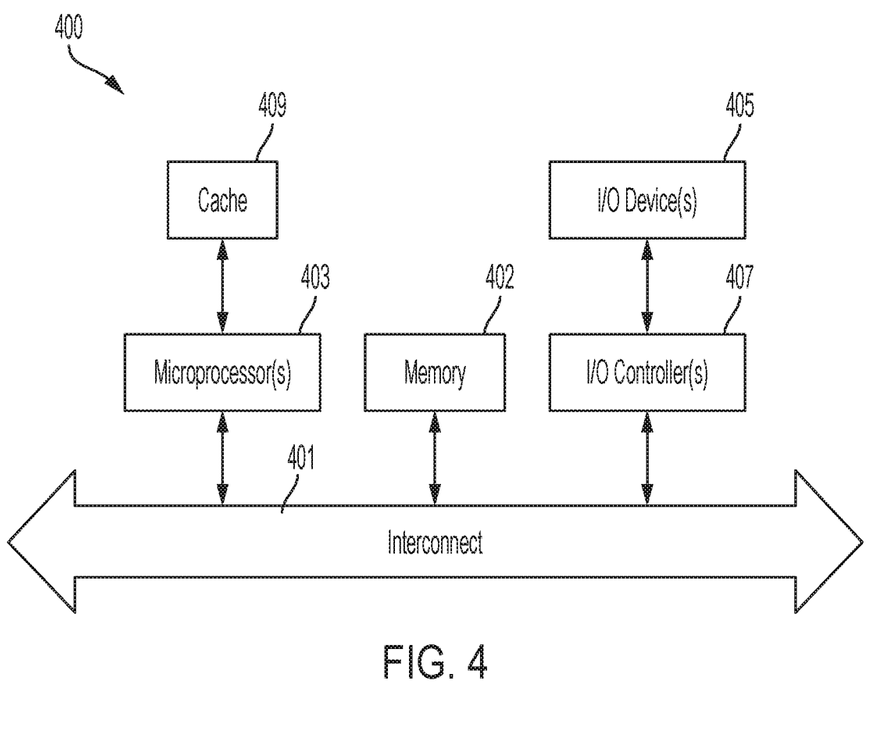
FIG. 4 shows a schematic of a computer system according to an embodiment.

FIG. 4 shows a computer system 400 according to an embodiment. The computer system 400 can include a microprocessor(s) 403 and memory 402. In an embodiment, the microprocessor(s) 403 and memory 402 can be connected by an interconnect 401 (e.g., bus and system core logic). In addition, the microprocessor 403 can be coupled to cache memory 409. In an embodiment, the interconnect 401 can connect the microprocessor(s) 403 and the memory 402 to input/output (I/O) device(s) 405 via I/O controller(s) 407. I/O devices 405 can include a display device and/or peripheral devices, such as mice, keyboards, modems, network interfaces, printers, scanners, video cameras and other devices known in the art. In an embodiment, (e.g., when the data processing system is a server system) some of the I/O devices 405, such as printers, scanners, mice, and/or keyboards, can be optional.

In an embodiment, the interconnect 401 can include one or more buses connected to one another through various bridges, controllers and/or adapters. In one embodiment, the I/O controllers 407 can include a USB (Universal Serial Bus) adapter for controlling USB peripherals, and/or an IEEE-1394 bus adapter for controlling IEEE-1394 peripherals.

In an embodiment, the memory 402 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of an application claiming priority to this provisional application to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for a computer system of a centralized payment registration system to automatically make on-demand payments on behalf of a user, comprising:

registering and associating, by the computer system, payment requesters, electronic communication clients, and payment services in a database, the registering including storing in the database a plurality of identifiers, including payment requester identifiers, electronic communication client identifiers, and payment service identifiers;

responsive to a first payment requester of the payment requesters sending a payment request electronic message to a user without a request from the user, the payment request message sent to a first electronic communication client of the electronic communication clients executing on a mobile device, and responsive to user selection of a component, including a link, in the payment request electronic message that initiates execution of operations that effect payment:

retrieving, by the computer system over a network, from the payment request electronic message a first identifier of the first payment requester and a second identifier of the first electronic communication client, the first identifier and the second identifier included in the plurality of identifiers stored in the database;

authenticating, by the computer system, the first payment requester as being registered to receive payments when the first identifier and the second identifier are associated in the database;

responsive to authenticating the first payment requester, communicating by the computer system, the authentication to the first electronic communication client;

accessing, by the computer system, the database to automatically identify a first payment service that is registered as an approved payer to the first payment requester, and authenticating the first payment service as being approved to make payments to the first payment requester by finding an association in the database between the plurality of identifiers identifying the first payment requester, the first electronic communication client, and the first payment service; and causing by the computer system, a transfer of funds from the first payment service to the first payment requester.

2. The method of claim 1, wherein causing a transfer of funds from the first payment service to the first payment requester includes a transferring of funds directly into a payment requester account through a money transfer system.

3. The method of claim 1, wherein the first electronic communication client and the first payment service are owned by the same company.

4. The method of claim 1, wherein the first electronic communication client and the first payment service are owned by different companies.

5. A computer system of a centralized payment registration system, comprising:
   one or more processing components;
   one or more data storage components including a database, at least one of the one or more data storage components include instructions that when executed cause at least one of the one or more processing components to perform operations including:
   registering and associating payment requesters, electronic communication clients, and payment services in the database, the registering including storing in the database a plurality of identifiers, including payment requester identifiers, electronic communication client identifiers, and payment service identifiers;
   responsive to a first payment requester of the payment requesters automatically sending a payment request electronic message to a user without a request from the user, the payment request message sent to a first electronic communication client of the electronic communication clients executing on a mobile device, and responsive to user selection of a component, including a link, in the payment request electronic message that initiates execution of operations that effect payment:
      retrieving, by the computer system over a network, from the payment request electronic message a first identifier of the first payment requester and a second identifier of the first electronic communication client, the first identifier and the second identifier included in the plurality of identifiers stored in the database;
      authenticating the first payment requester as being registered to receive payments in response to the request for payment when the first identifier and the second identifier are associated in the database;
      responsive to authenticating the first payment requester, communicating by the computer system, the authentication to the first electronic communication client;
      accessing the database to automatically identify a first payment service that is registered as an approved payer to the first payment requester, and authenticating the first payment service as being approved to make payments to the first payment requester by finding an association in the database between the plurality of identifiers identifying the first payment requester, the first electronic communication client, and the first payment service; and
      causing a transfer of funds from the first approved payment service to the first payment requester.

6. The computer system of claim 5, wherein causing a transfer of funds from the first payment service to the first payment requester includes a transferring of funds directly into a payment requester account through a money transfer system.

7. The computer system of claim 5, wherein the first electronic communication client and the first payment service are owned by the same company.

8. The computer system of claim 5, wherein the first electronic communication client and the first payment service are owned by different companies.

9. A non-transitory computer-readable medium comprising computer readable instructions which when executed by a computer system of a centralized payment registration system, cause the computer system to perform operations including:
   registering and associating, by the computer system, payment requesters, electronic communication clients, and payment services in a database, the registry including storing in the database a plurality of identifiers, including payment requester identifiers, electronic communication client identifiers, and payment service identifiers;
   responsive to a first payment requester of the payment requesters sending a payment request electronic message to a user without a request from the user, the payment request message sent to a first electronic communication client of the electronic communication clients executing on a mobile device, and responsive to user selection of a component, including a link, in payment request the electronic message that initiates execution of operations that effect payment:
      retrieving, by the computer system over a network, from the payment request electronic message a first identifier of the first payment requester and a second identifier of the first electronic communication client, the first identifier and the second identifier included in the plurality of identifiers stored in the database;
      authenticating, by the computer system, the first payment requester as being registered to receive payments when the first identifier and the second identifier are associated in the database;
      responsive to authenticating the first payment requester, communicating by the computer system, the authentication to the first electronic communication client;
      accessing, by the computer system, the database to automatically identify a first payment service that is registered as an approved payer to the first payment requester and authenticating the first payment service as being approved to make payments to the first payment requester by finding an association in the database between the plurality of identifiers identifying the first payment requester, the first electronic communication client, and the first payment service; and
      causing by the computer system, a transfer of funds from the first payment service to the first payment requester.

* * * * *